Nov. 8, 1966    R. L. SHOEMAKER    3,283,650
PICTURE-SLIDE CONVERSION APPARATUS
Filed April 29, 1964    3 Sheets-Sheet 1

INVENTOR:
Robert L. Shoemaker
By Stevens, Lehren & Stevens
Att'ys

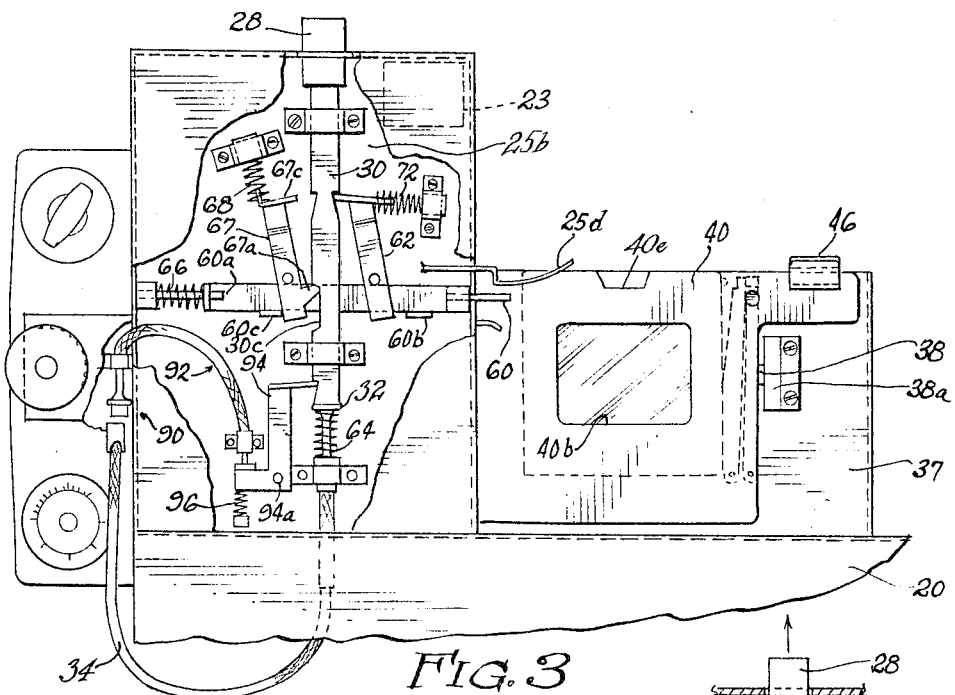
FIG. 3
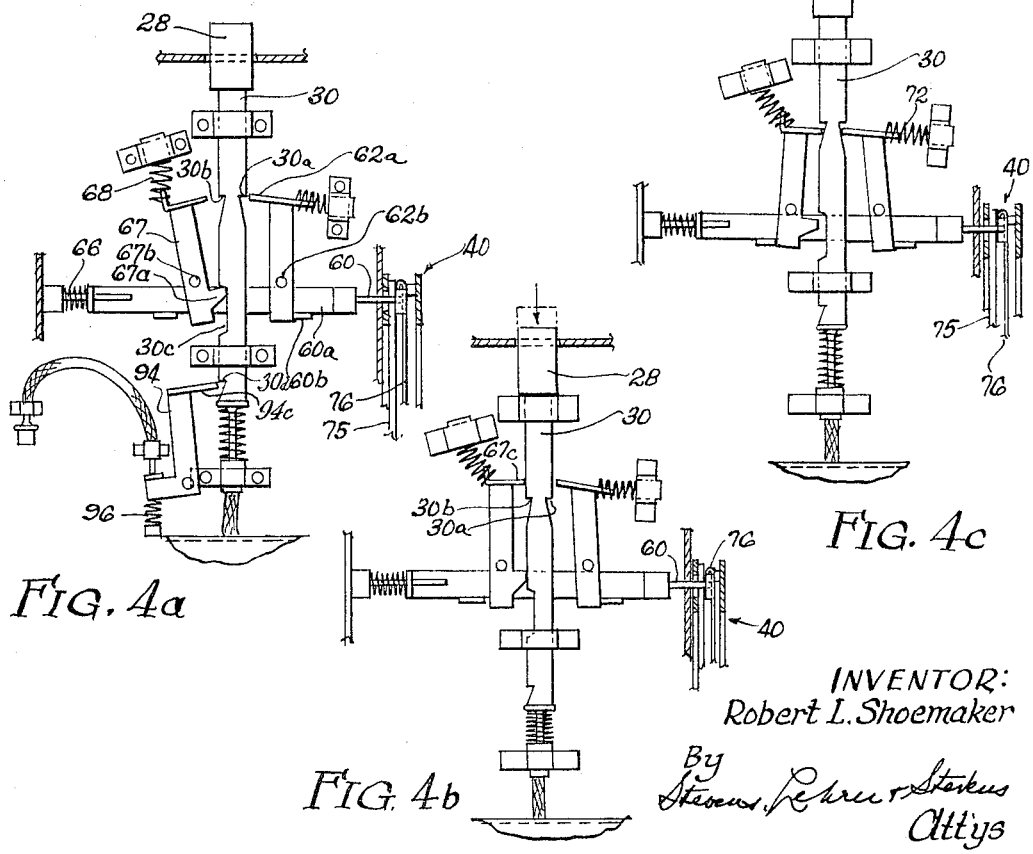
FIG. 4a
FIG. 4b
FIG. 4c
INVENTOR:
Robert L. Shoemaker
By Stevens, Lehrer & Starkus
Att'ys Nov. 8, 1966  R. L. SHOEMAKER  3,283,650
PICTURE-SLIDE CONVERSION APPARATUS
Filed April 29, 1964
3 Sheets-Sheet 3
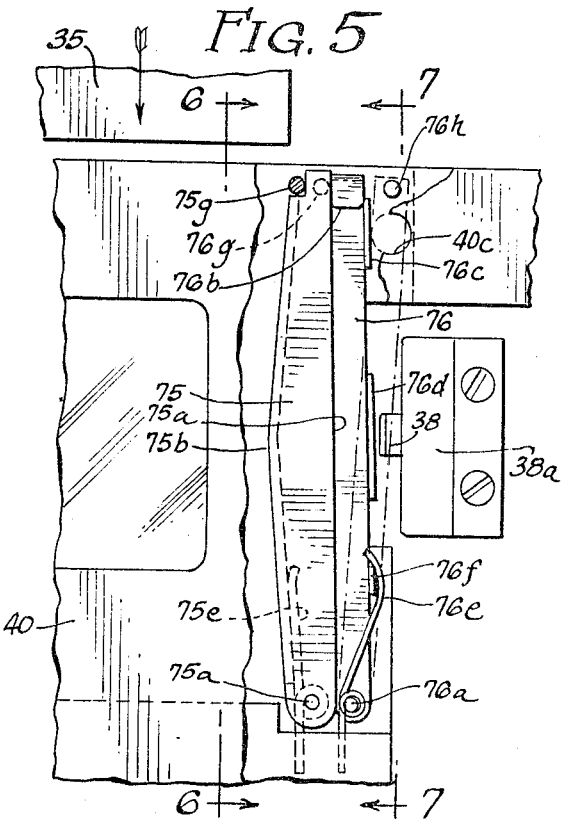
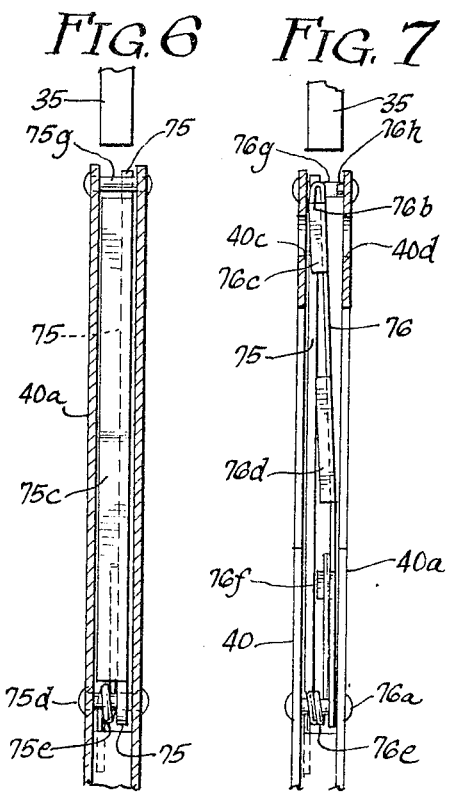
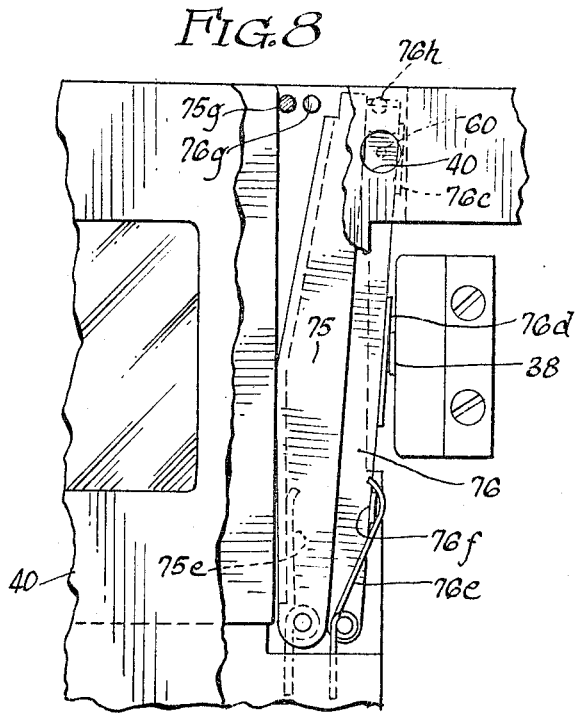
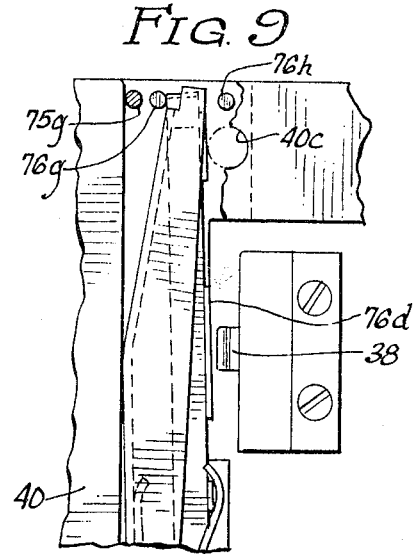
INVENTOR:
Robert L. Shoemaker
By Stevens, Lehren + Stevens
Attys

United States Patent Office 3,283,650
Patented Nov. 8, 1966

3,283,650
PICTURE-SLIDE CONVERSION APPARATUS
Robert L. Shoemaker, 1017 Elm St., Winnetka, Ill.
Filed Apr. 29, 1964, Ser. No. 363,393
11 Claims. (Cl. 88—24)

My invention relates to slides bearing pictorial, educational or advertising matter for use by teachers, salesmen, and instructors in industry. Such a slide usually consists of a color transparency mounted in a double frame. The form of the slide is square, but its picture is elongated horizontally as a rule for sequential adaptation to a camera film strip While slides of the above character are suitable for projection in single order on a screen, the storage of the slides requires considerable space; and their handling is not only time-consuming, but subject to error when extreme care is not used, such as being projected out of turn, or inserted into the projector with the picture inverted, backward, or with the long dimension vertical. Also, checking slides for position is often difficult because of the small size of the picture and insufficient light for viewing the same.

To avoid the handling of the slides individually or in quantities every time they are to be projected, it has been the practice in recent years to cast the slide transparencies on a film strip in the desired order by photography. While cameras have been adapted for this purpose by synchronizing the film strip advance in registration with the picture in the slide, and provided with means to actuate the flash bulb in synchronism with the camera shutter and prevent double exposure, similar instrumentalities in respect to the slide require the skill of an expert photographer to operate them efficiently, and are complicated and costly.

It is the primary object of the present invention to improve the practice just described by providing an apparatus which can be handled and operated by the average person, with the factor of human error virtually eliminated.

A further object is to provide a device in conjunction with the film strip camera for receiving the slide, directing a strong light through it, and enabling it to be viewed on a magnified scale.

Another object is to provide a receptacle for the slide which is suitable in one position for viewing the picture as stated, and movable from the viewing position to one opposite the camera for taking the picture.

A still further object is to provide a slide-actuated mechanism in conjunction with the camera control which prevents the second exposure of a taken slide, whether the latter is in the taking position or away from the same.

A further object is to provide means for preventing the exposure of the film (taking of a blank picture) when no slide is in front of the camera.

A still further object is to provide means for preventing the camera controlling mechanism from being operated until the film strip has been advanced and the shutter cocked.

Another object is to employ a fixed light value for the camera, but vary the amount of light cast on the slide by an adjustable light reflecting and diffusing facility.

An important object is to construct the novel apparatus compactly and along lines of simplicity.

A better understanding of the invention may be gained by reference to the accompanying drawings, in which:

FIG. 3 is a front elevation, partly broken away, showing the parts of a camera actuating mechanism as positioned when the apparatus is not in use;

FIGS. 4a to 4c show changes in the positions of the mechanism when the apparatus is operated;

FIG. 5 is an elevation, partly broken away and on an enlarged scale, showing the positions of parts in a slide gate while the apparatus is not in use;

Figure 1:
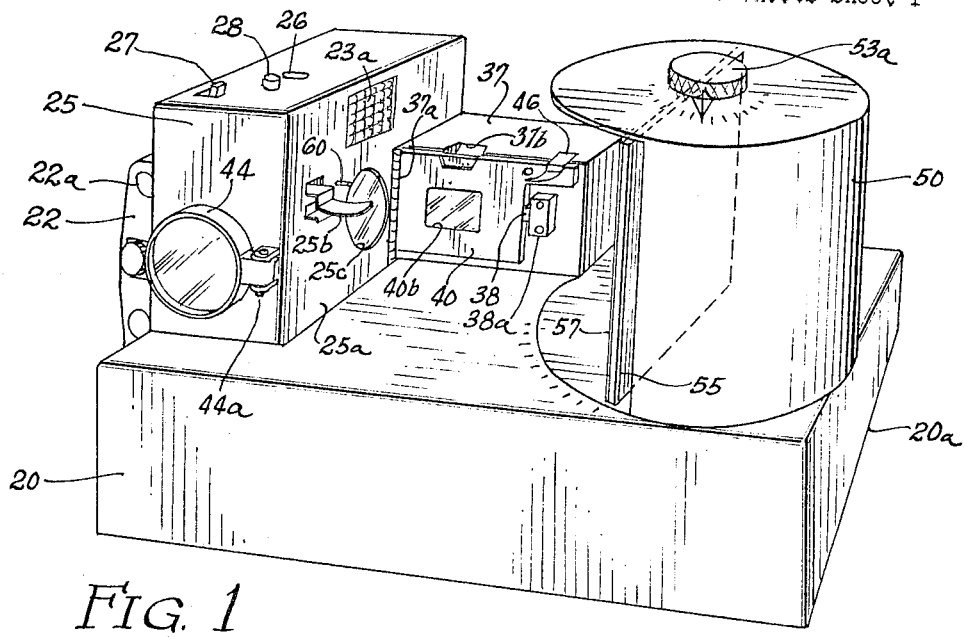
FIG. 1 is a perspective view of the apparatus.

FIGS. 6 and 7 are edge views of the parts just referred to when viewed from the lines 6—6 and 7—7 of FIG. 5, respectively, and FIGS. 8 and 9 are views similar to FIG. 5, showing changes in the positions of parts therein.

Referring specifically to the drawings, 20 denotes the base of the apparatus. The latter is primarily divisible into four units, namely, the camera, a camera control box, a slide holder, and a shadow box.

The camera 22 is of conventional design, with a knob 22a for winding a film strip on one of its internal spools. For the present purpose the focus and lens opening and shutter speed of the camera are fixed, and when the film strip is advanced after each picture is taken, the shutter is automatically cocked. Also, an electronic flash-bulb unit 23 is installed in the camera control box 25, such unit containing a condenser circuit (not shown) with an indicating lamp 26. The flash-bulb unit is synchronized with the shutter of the camera to emit a flash when the picture is taken; and the condenser circuit receives a cord from a conventional current outlet. Thus, when the cord is plugged into the outlet, and a slide switch 27 on the control box is operated, the charging of the condenser commences; and the lighting of the indicating lamp 26 is evidence that the flash-bulb is ready for use. These camera features are well known, and therefore need not be described in greater particular. Additional manual controls for the camera are the winding knob 22a and a button 28 in the top of the control box. As seen in FIG. 3, this button is part of a vertical plunger 30 which procures the taking of the picture by pressing the head 32 of the conventional flexible shaft 34 that leads to the camera shutter.

The lens of the flash-bulb unit 23 is seen at 23a; and the holder of the picture slide 35 is a casing 37 adjacent to the camera control box 25. The slide is shown deposited in a gate 40 which is hinged to the casing as indicated at 37a. The gate has large openings 40b in front and back of a size to register with the picture in the slide; and the latter is designed for illumination from the rear by a lamp 42 held by a reflector 42a mounted in the casing 37.

Figure 2:
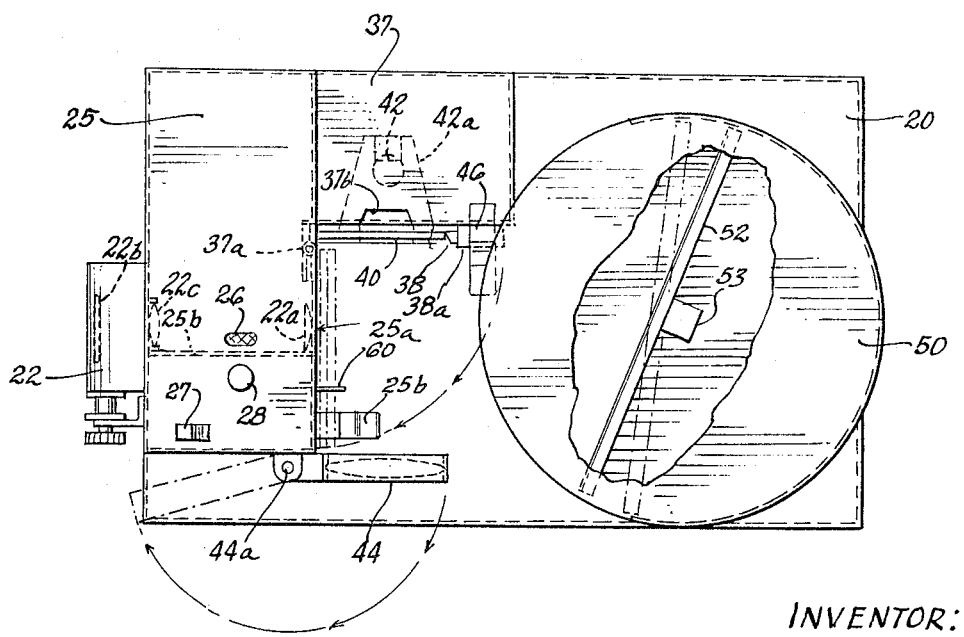
FIG. 2 is a top plan view, with the slide-viewing facility moved into operative position.

The deposit of the slide in the gate 40 operates by means of an internal mechanism in the gate and the button 38 of a lateral switch 38a to light the lamp 42. The picture in the slide thus becomes illuminated for viewing from the front; and a better view of the picture is had by using a magnifying glass 44. FIG. 1 and dotted lines in FIG. 2 show that this glass is hinged at 44a to the control box 25, and folded back on the same while the apparatus is not in use. However, the magnifying glass may be swung into the space in front of the gate as shown in FIG. 2 to afford a direct view of the illuminated picture in the slide. It is now possible to see whether the proper side of the picture is in view, and also whether the slide has been deposited upright, inverted, on one end, or on the other end. The factor of human error in the deposit of the slide is thus virtually eliminated.

The gate 40 is held to the frame 37 by a spring latch 46. When the latter is released the gate may be swung out to close on the control box wall 25a as indicated by dotted lines in FIG. 2, and become held by a latch 25d. This action brings the frontal picture opening 40b into registration with a similar opening 25c in the box wall 25a. In this position the gate locates the slide in focus with the camera lens and in readiness for taking the picture on the camera film strip.

The lamp 42 is only designed for the viewing of the slide in the original position. A mechanism carried by the gate releases pressure on the switch button 38 when the gate is swung out to close on the control box, so that the picture is no longer illuminated when it assumes the position to be photographed by the camera. However, when the picture is to be taken, a suitable flash-bulb could be mounted at a point outside the closed gate to flash the light on the slide the moment the camera is actuated. However, owing to differences of light intensity in ordinary surroundings, differences of light intensity prescribed for various types of film, and the uneven character of direct light from a bulb, it is preferable to light the slide by controlled reflection. Thus, FIGS. 1 and 2 show a shadow box 50 located opposite the flash-bulb lens 23a, the shadow box containing a frame 52 centered on a vertical shaft 53 which carries a finger knob 53a above the shadow box. The frame may be loaded with a group or opal glass 57 on the inner side, and adapted to receive one of a selection of panels 55 on the outer side. The panels come in different shades of grey. They may be numbered to suit different types of slides for corresponding degrees of reflecting intensity; and such intensity may be varied further by turning the frame 52 to different angles, one such setting being indicated in FIG. 2. The calibrations noted on the base may serve as a guide for setting a reflecting panel for different degrees of light intensity.

When a slide has been deposited in the gate 40, and the latter swung to close against the control box 25, an element in the gate impinges on a pin 60 projecting from the box to unlock a mechanism therein, so that the top button 28 may be pressed to take the picture. When the apparatus is not in use, the button 28, plunger 30 and other parts of the control box mechanism appear as seen in FIG. 3, the plunger being locked by the seating of the hook 62a of a stop lever 62 in a notch 30a of the plunger 30, as seen in FIG. 3, so that the button 28 cannot be depressed manually, or accidentally from impact by an external object. However, when the picture is desired taken and the gate 40 closed as stated, the pin and a slide bar 60a from which the pin is extended move toward the left, this motion being resisted by a compression spring 66. The stop lever 62 is pivoted on a pin 62b secured in a partition 25b of the control box 25; and the heel of the stop lever is urged by a side lug 60b of the slide bar 60a to pivot in clockwise direction and withdraw the hook 62a of the stop lever from the notch 30a of the plunger 30, as seen in FIG. 4a. The plunger is now released for downward travel, so that the picture can be taken when the button 28 is pressed.

As long as the gate 40 is in the closed position, the slide bar 60a and the stop lever are in the positions shown in FIG. 4a; and when the plunger has returned to its original position—by the upward urge of a compression spring 64 on the camera-actuated shaft 34—nothing would prevent the button from being pressed by mistake one or more times to take the same picture on succeeding frames of the camera film strip. To prevent such an occurrence, a toggle lever 67 companion to the stop lever 62 is pivoted similarly—on a pin 67b—on the left-hand side of the plunger 30. The slide bar 60a may be guided for horizontal movement by suitable means; and the pins 62b and 67b may be positioned over the upper edge of the slide bar as part of such means.

The toggle lever 67 has a hook 67c at its upper end, and a spur 67a near its lower end, the hook being directed toward a notch 30b companion to the plunger notch 30a, but on the left-hand side; and the spur 67a lodges in the upper end of a long notch 30c made in the left-hand edge of the plunger. The toggle lever is positioned normally as shown in FIG. 3, where it is held by a side lug 60c of the slide bar 60a, as seen in FIG. 3. In this position the toggle lever biases a toggle-spring 68 above it toward the left in the position shown.

When the slide bar 60a has been moved to the left as described before, the side lug 60a departs from the toggle lever, but the latter is maintained by the bias spring 68 with the spur 67a in the upper end of the long notch 30c, as seen in FIG. 4a. However, when the plunger is depressed for taking the picture, the spur 67a of the toggle lever is carried out of the long notch 30c, causing the toggle lever to bias the spring 68 toward the right, where it urges the hook 67c against the side of the plunger as seen in FIG. 4b, having no effect on the latter. However, when the plunger is released and rises from the force of the spring 64, the hook 67c falls into the left-hand notch 30b of the plunger as seen in FIG. 4c, locking the plunger from being depressed a second time.

During the above operations the gate 40 remained closed against the control box 25, and the slide bar 60a was therefore maintained at the left-hand end of its travel. After the picture has been taken, the gate is swung out to permit the removal of the taken slide. This movement releases pressure from the slide bar pin 60, so that the slide bar returns to the right. This movement allows the stop lever 62 to be rocked back to its initial position by a compression spring 72, so that the hook of the stop lever reenters the notch 30a where it remains to keep the plunger from being depressed, as noted in the right-hand portion of FIG. 4c. However, the same figure shows that shortly after this action the return movement of the slide bar 60a causes the side lug 60c of the same to bear on the heel of the toggle lever 67 and causes it to bias the toggle spring 68 to its left-hand limit, as seen in FIG. 3, to remain inactive until the gate bearing another slide is again closed, and the button 28 depressed for the taking of the next picture. It is important that the hook 67c remain in the notch 30b until after the hook 62a is in the notch 30a in order that there be no moment during the opening of the gate with the taken slide when the button 28 may be depressed to take a picture.

Before the opening of the gate and its effect on the camera control mechanism are explained, it is proper to mention two camera conditions which must also be met before the plunger 30 can be depressed for the taking of the picture. Such conditions deal with the advance of the film strip in the camera, and the cocking of its shutter. In conventional cameras the film advance—whether procured by winding a knob or automatically—is transmitted by a cam mechanism to a lever which controls the shutter. This lever is illustrated endwise at 90 in FIG. 3. Thus, when a film advance occurs, the lever rises from the position in FIG. 3 to that in FIG. 4a to cock the shutter. For the present purpose a connection is provided to lock the plunger from descent as long as the film is not advanced and the shutter not cocked, that is, while the lever 90 is in the low position indicated in FIG. 3, but to release the plunger in case the film has been advanced and the shutter cocked, that is, when the lever 90 has been raised to the position indicated in FIG. 4a. The connection mentioned features an angle detente 94 pivoted on a stationary pin 94a projecting from the partition 25b. A flexible shaft 92 leads from above the lever 90 to the heel of the detent 94; and a compression spring 96 urges a top hook 94c of the detent to seat in a side notch 30d made in the plunger, locking the same from descent, as seen in FIG. 3. However, when the lever 90 rises as explained, the shaft 92 is pushed to rock the detent in counter-clockwise direction and release the plunger. The form of connection shown and described is an example suitable for one type of camera, and other forms of the connection may be used to suit cameras of different types. It is also feasible to control the condenser indicating lamp 26 by means of the detent 94.

Thus, a suitable switch may be associated with this detent to turn on the indicating lamp as a signal that the film strip in the camera has been advanced, and that the shutter is cocked.

The gate 40 is constructed for cooperation with the control box pin 60 as previously mentioned when a slide is deposited; and this operation is preferably initiated when the gate is in the slide-viewing position, because in such position the gate mechanism is also effective to light the viewing lamp 42. The gate is in the nature of a deep pocket with open ends, the front wall of the gate being marked 40, and the rear wall 40a. Inside the gate are located a pair of levers arranged side-by-side, one being a cam lever 75, and the other a backing lever 76.

The cam lever 75 is located next behind the front wall 40 of the gate. The lever is of rigid construction with an upright edge 75a on the right and an angular edge 75b on the left and forming a cam. The latter is flanged in rearward direction, as indicated at 75c, to present a flat edge, as seen in FIG. 6. The cam lever is pivoted near the bottom on a gate cross-pin 75d to swing from side to side; and the normal position of the cam lever is as in FIG. 5 where a gate spring 75e bears against the flange 75c to hold the lever against a cross-pin 75g spanning the gate walls near the top as seen in FIGS. 5 and 6. The deposit of the slide 35 in the gate clears the cross-pin 75g, but crowds the cam lever 75 to swing a short distance toward the right as seen in FIG. 8.

The backing lever 76 is a leaf spring pivoted with its lower end on a cross-pin 76a. The upper end of the lever is bent in forward direction to form a hook 76b, and the edge remote from the cam lever has an upper forward flange 76c and a lower similar flange 76d. The lever is biased to bear with the hook 76b against the front wall of the gate, so that the hook is normally alined with the cam lever 75 as seen at the top of FIG. 7. The backing lever is also urged toward the left as seen in FIG. 5 by a gate spring 76e which engages a lug 76f bent forwardly from the lever; and the lever meets a stop pin 76g as a limit, the stop pin being projected forwardly from the rear gate wall.

The gate walls also have small registering openings 40c and 40d on the right-hand side of the backing lever 76, as shown in FIGS. 5 and 7, the position of these openings being such as to receive and clear the pin 60 projecting from the control box wall 25a when the gate is closed against such wall. Above the opening 40c a backing pin 76h projects forwardly from the back wall of the gate. Below the openings 40c and 40d, the button 38 of the lamp switch 38a is situated in the right-hand swinging path of the backing lever flange 76d, as seen in FIG. 5.

It follows now that the tilting of the cam lever 75 by the deposit of the slide into the gate will in turn tilt the backing lever to a point behind the frontal gate opening 40c, as seen in FIG. 8; and the tilting of the backing lever will push the button 38 to light the lamp 42, so that the deposited slide may be viewed for correct position. When this has been determined, the gate may be unlatched from the viewing position and swung toward the control box 25. The departure of the backing lever 76 from the button 38a as this movement is initiated allows the button to return to its initial projected position—seen in FIG. 5— so that the viewing lamp is extinguished. It follows now, when the gate meets the wall 25a of the control box, that the backing lever bears on the pin 60, with the flange 76c on the frontal side of the pin, as is suggested in FIG. 8, to procure the taking of the picture, as previously described. However, the pin resists after it has completed its picture-taking function to the extent of flexing the backing lever rearwardly to a position behind the plane of the cam lever, 75, the flexing limit being the backing pin 76h. The flexing pressure prevails as long as the gate is closed against the control box. There is, of course, side pressure on the backing lever at all times by the gate spring 76e urging the return of the lever now that it clears the cam lever 75, but the side lug 76c finds the pin 60 as a stop in this respect. However, after the picture has been taken, the initial tug on the gate to open it draws the side lug 76c clear of the pin 60 and relaxes the flexing pressure on the backing lever sufficiently to make it yield sidewise—toward the left as seen in FIG. 8—to the gate spring 76e, so that the backing lever swings behind the cam lever 75 as seen in FIG. 9, clearing the gate openings 40c and 40d and meeting the stop pin 76g as a limit. Now the inadvertent closing of the gate on the control box—while still loaded with the same slide—will not again operate the camera, since no part is positioned to bear on the pin 60.

After the picture of the slide has been taken as explained, it follows that the gate 40 should be opened for the removal of the taken slide. This is possible at any point after the gate is unlatched from the control box, but a safeguard is gained when the gate is swung out fully to latch against the casing 37 after each picture taking. It will be recalled that the first tug on the gate to open it from the control box accomplished the return of the backing lever 76 from the position intersecting the gate openings 40c and 40d. The lever is therefore in the retracted position relative to the lamp switch button 38 when the gate meets the casing 37, and does not actuate the switch to light the lamp 42. The taken slide is therefore not illuminated, but may be removed by way of finger notches 40e made in the top of the gate and facing a clearance cut-out 37b in casing 37. However, in case the slide is not removed at the time, the fact that the gate is found at a later time to be loaded with an unlighted slide is the safeguard against using the same slide again, since the lighting of the slide in a loaded gate is a tell-tale that it is a new one.

It is noted that the switch button 38 is beveled for cammed engagement by the backing lever 76. This will prevent the lever from being moved out of position when the gate swings away from the casing 37.

When a taken slide is lifted out of the gate, it allows the cam lever 75 to return to the original position of FIG. 5, as limited by the cross-pin 75g. Looking at FIG. 9, it will be apparent that the cam lever rides off the backing lever 76 during this movement. The forward tension of the backing lever now causes it to resume its position against the front wall 40 of the gate, and become re-set alongside the cam lever 75, as seen in FIG. 5.

It is now apparent that the novel apparatus has a number of advantageous features. First, it combines a slide viewer and a slide filming facility in one appliance. Further, the viewer is also a carrier which applies the slide to the film-strip camera in registration with the lens thereof by the simple swing of the slide from the viewing position to the camera-facing one. Further, the closing of the slide on the camera control box—which could occur inadvertently—does not of itself take the picture, but releases the camera control for the consequent manual pressing of the shutter-operating button only when the picture is desired to be taken. Further, the mechanism of the slide gate is constituted not to allow a slide to be photographed a second time when it has once been taken, and not to cause a picture to be taken when no slide is contained in the gate. The apparatus therefore insures the proper conversion of the slides to film-strip form by first affording illumination and enlarging of slide pictures for the viewer for accuracy in slide-positioning; and greater convenience is added in this respect by beveling the bottom of the base 20 as seen at 20a in FIG. 1, so that the viewing angle is tilted in line with the vision of a person seated at a desk on which the apparatus is placed. Also, uncertainty whether a slide has been taken is avoided, since only an untaken slide will light the viewing lamp and permit the camera picture-taking button to be pushed. Finally as a camera accessory, the apparatus is compact and quite simple in comparison with installations which have come to my attention aiming to accomplish similar results.

While I have described the apparatus along specific lines, various minor changes and refinements may be made therein without departing from its principle, and I reserve the right to employ all such changes and refinements as may fall within the scope and spirit of the appended claims.

I claim:

1. A camera accessory applicablie to the front of the camera, a gate carried by the accessory and adapted to receive a picture slide, the gate foldable from a position for viewing the slide to one opposite the accessory for photographing slide by the camera, a manual actuator carried by the accessory for operating the camera, and a control normally locking the actuator and movable to actuator-releasing position when the gate is folded on the accessory.

2. A camera accessory applicable to the front of the camera, a gate carried by the accessory and adapted to receive a picture slide, the gate foldable from a position for viewing the slide to one opposite the accessory for photographing the slide by the camera, a manual actuator carried by the accessory for operating the camera, a control normally locking the actuator projected toward the gate as it closes on the accessory, the gate having a clearance for said control when not loaded with a picture slide, and means carried by the gate and effective to bar said clearance and exercise the control after the slide has been deposited into the gate.

3. A camera accessory applicable to the front of the camera, a gate carried by the accessory and adapted to receive a picture slide, the gate foldable from a position for viewing the slide to one opposite the accessory for photographing the slide by the camera, a manual actuator carried by the accessory for operating the camera, a control normally locking the actuator and projecting an element toward the gate as it closes on the accessory, the gate having a perforation clearing said element, a cam lever crowded toward said perforation by the insertion of the picture slide into the gate, a flexible backing lever biased toward the cam lever and urged to a position behind the perforation in such event, the closing of the gate on the accessory flexing the backing lever clear of the cam lever to be responsive to its biasing influence and move to a position behind the cam lever.

4. A camera accessory applicable to the front of the camera, a gate carried by the accessory and adapted to receive a picture slide, the gate foldable from a position for viewing the slide to one opposite the accessory for photographing the slide by the camera, a manual actuator carried by the accessory for operating the camera, a control normally locking the actuator and projecting an element toward the gate as it closes on the accessory, the gate having a perforation clearing said element, a cam lever crowded toward said perforation by the insertion of the picture slide into the gate, a flexible backing lever biased toward hte cam lever and urged to a position behind the perforation in such event, the closing of the gate on the accessory flexing the backing lever clear of the cam lever to be responsive to its biasing influence and move it to a position behind the cam lever, the latter being biased to return to its original position clear of the backing lever when relieved by the withdrawal of the picture slide, and the backing lever then returning in forward direction to a position alined laterally with the cam lever.

5. A camera accessory applicable to the front of the camera, a gate carried by the accessory and adapted to receive a picture slide, the gate foldable from a position for viewing the slide to one opposite the accessory for photographing the slide by the camera, means in the accessory for operating the camera, a plunger depressible to actuate said means, a stop lever applicable to the plunger from one side and normally locking the same from descent, a slide bar moved by the gate when folded, a toggle lever applicable to the plunger from another side, and means normally biased to retain the toggle lever out of engagement with such other side, and a projection of the toggle lever engageable by the plunger on descent to move the toggle lever toward the plunger, said means then becoming biased correspondingly and effective to engage the toggle lever on such other side.

6. A camera accessory applicable to the front of the camera, a gate carried by the accessory and adapted to receive a picture slide, the gate foldable from a position for viewing the slide to one opposite the accessory for photographing the slide by the camera, means in the accessory for operating the camera, a plunger depressible to actuate said means, a slide bar moved by the gate when folded, means urging the slide bar for return movement, a toggle lever with a hook applicable to the plunger from the side, yieldable means normally biased to position the toggle lever with its hook out of engagement with such side, a projection of the toggle lever seating in a side notch of the plunger and actuated by the upper end of the notch to position the toggle lever with its hook in engagement with said side when the plunger is depressed, said yieldable means becoming biased by the engaging movement of the toggle lever hook to maintain such engagement, the plunger having a second notch opposite the toggle lever hook positioned below the latter when the plunger is depressed, and the raising of the plunger causing the hook to fall into said second notch and lock the plunger from being depressed while the gate holds the slide bar against return movement.

7. A camera accessory applicable to the front of the camera, a gate carried by the accessory and adapted to receive a picture slide, the gate foldable from a position for viewing the slide to one opposite the accessory for photographing the slide by the camera, means in the accessory for operating the camera, a plunger depressible to actuate said means, a slide bar moved by the gate when folded, means urging the slide bar for return movement, a toggle lever with a hook applicable to the plunger from the side, yieldable means normally biased to position the toggle lever with its hook out of engagement with such side, a projection of the toggle lever seating in a side notch of the plunger and actuated by the upper end of the notch to position the toggle lever with its hook in engagement with said side, when the plunger is depressed, said yieldable means becoming biased by the engaging movement of the toggle lever hook to maintain such engagement, the plunger having a second notch opposite the toggle lever hook positioned below the latter when the plunger is depressed, and an element carried by the slide bar and effective on the return movement of the slide bar when the gate is opened, to reverse the position of the toggle lever and withdraw its hook from said second notch, whereby to release the plunger for rising movement, and yieldable means inducing the rising movement of the plunger in such event.

8. A camera accessory having an opening which registers with the camera lens when the accessory is applied to the front of the camera, a gate carried by the accessory at one side of the opening for receiving a picture slide, and an enlarging glass carried by the accessory at the other side of the opening and usable for viewing the picture slide to determine its correct position, the gate being foldable with the slide in front of the opening to expose the slide to said lens.

9. A camera accessory having an opening which registers with the camera lens when the accessory is applied to the front of the camera, a gate into which a picture slide may be deposited, the gate carried by the accessory at one side of the opening, and an enlarging glass folded against the accessory at the other side of the opening out of the path of approach to said gate, the enlarging glass usable when unfolded for viewing the slide to determine its correct position, and the gate being foldable with the slide in front of the opening to expose the slide to said lens.

10. The structure of claim 8, a lamp to illuminate the picture slide, a pressure-actuated switch to light the lamp, and gate-carried means pressing the switch when the picture slide is received in the gate, said means releasing the switch to extinguish the lamp on the folding of the gate.

11. The structure of claim 8, a lamp to illuminate the picture slide, a pressure-actuated switch adjacent to the gate to light the lamp, and a lever carried by the gate crowded as the picture slide is received in the same to press the switch, the lever releasing the switch to extinguish the lamp on the folding of the gate.

References Cited by the Examiner

UNITED STATES PATENTS

| | | | |
|---|---|---|---|
| 2,544,879 | 3/1951 | Harvey et al. | 95—31 |
| 3,002,426 | 10/1961 | McCabe | 88—26 |
| 3,065,667 | 11/1962 | Edgerton | 88—24 |

NORTON ANSHER, *Primary Examiner.*

RICHARD A. WINTERCORN, *Assistant Examiner.*